Patented Aug. 15, 1933

1,922,467

UNITED STATES PATENT OFFICE 1,922,467

SULPHURIZED PHENOL

Alfred Bergdolt, Vohwinkel-Hammerstein, and Fritz Ballauf, Elberfeld, Germany, assignors to General Aniline Works, Inc., New York, N. Y., a Corporation of Delaware No Drawing. Application September 4, 1930, Serial No. 479,788, and in Germany September 6, 1929

16 Claims. (Cl. 260—20)

The present invention relates to a process of preparing sulphurized phenols and to the new products obtainable thereby.

Sulphurized derivatives of phenols have been described in literature. They are for instance obtainable by heating phenols, homologues or substitution products thereof with sulphur in the presence of a caustic alkali and of water. The products thus obtainable have proved to be very suitable mordants for basic dyestuffs.

In accordance with the present invention there are prepared sulphurized derivatives of monohydric phenols by using instead of caustic alkalies an alkali metal carbonate in the process referred to above. Our new process is carried out by heating sulphur with a monohydric phenol or a derivative thereof, for example chlorophenol or homologues thereof, for example naphthols, with the addition of an alkali metal carbonate, such as sodium carbonate, bicarbonate or potassium carbonate, in an amount of at least 1/5 of the quantity of the phenol taking part in the reaction, and in the presence of a small amount of water. According to our investigations about molecular proportions of phenol and sulphur take part in the reaction, but the process is favorably carried out by working with an excess of phenol, said excess serving as diluent in our new process. The quantities of the alkali metal carbonates may be varied within wide limits, say from at least 1/5 to equal parts of the quantity of the phenol taking part in the reaction. A preferred method of carrying out our new process consists in using calcined sodium—or potassium-carbonate, the water set free in the reaction being sufficient for performing the process. The temperatures of reaction may range between the melting temperature of the reaction mixture and the boiling point of the same, preferably the reaction is performed under reflux. The process generally requires several hours and is complete when a test portion shows that the resinous reaction product which is soon formed has become completely soluble in water.

The products thus obtained are yellowish substances, easily soluble in water and in organic solvents, such as alcohol and acetone. They are very suitable mordants for basic dyestuffs; compared with the products obtainable according to the former processes referred to above, the new products, when used as mordants, yield clearer shades due to the fact that the cotton remains nearly white in the mordant process.

The invention is illustrated by the following examples, without being limited thereto:

Example 1.—160 parts by weight of phenol, 100 parts by weight of sulphur and 37 parts by weight of calcined sodium carbonate are heated with 70 parts of water under a reflux condenser until a test portion shows that the reaction is complete and that the whole has become soluble in water. The substance is then dried, preferably at 60° C. in vacuo. Thus is obtained a yellowish powder, which is most readily soluble in water and when absorbed on the cotton fiber yields a pure white.

Example 2.—300 parts by weight of phenol, 100 parts by weight of sulphur and 37 parts by weight of calcined sodium carbonate are heated with 70 parts of water under a reflux condenser until the reaction is complete. The excess phenol is then distilled off in vacuo together with the water. On cooling, the product described in Example 1 is obtained.

Example 3.—300 parts by weight of phenol, 100 parts by weight of sulphur and 100 parts by weight of crystalline sodium carbonate ($Na_2CO_3.10H_2O$) are treated as in Example 2. The resulting product is identical with that of Example 2.

Example 4.—300 parts by weight of phenol, 100 parts by weight of sulphur and 37 parts by weight of calcined sodium carbonate are treated with 30 parts of water with the same result as in Example 2.

Example 5.—300 parts by weight of phenol are boiled under a reflux condenser with 40 parts by weight of calcined sodium carbonate and 65 parts by weight of water until sodium phenolate is formed. 100 parts by weight of sulphur are then added, and the heating is continued for 4–5 hours. The excess phenol is then distilled off together with the water. On cooling, there is obtained a product possessing the properties above described.

Example 6.—300 parts by weight of phenol are boiled with 40 parts by weight of anhydrous sodium bicarbonate under a reflux condenser until sodium phenolate has been formed. 100 parts by weight of sulphur are then added to the hot solution, and heating is continued until the reaction is complete. The excess phenol is distilled off together with the water formed, and on cooling, a product possessing the above described properties is obtained.

Example 7.—300 parts by weight of phenol, 100 parts by weight of sulphur and 40 parts by weight of calcined sodium carbonate are treated as described in Example 2. When the reaction is complete, the excess phenol is distilled off together with the water formed, and on cooling, a product is obtained possessing the above described properties.

*Example 8.*—200 parts by weight of o-chlorophenol, 100 parts by weight of sulphur and 37 parts by weight of calcined sodium carbonate are heated with 70 parts of water under reflux condenser until a test portion shows that the reaction is complete and that the whole has become soluble in water. The substance is then dried, preferably at 60° C. in vacuo. Thus is obtained a yellowish powder, which is most readily soluble in water and when absorbed on the cotton fiber yields a pure white.

*Example 9.*—240 parts by weight of α-naphthol, 100 parts by weight of sulphur and 37 parts by weight of calcined sodium carbonate are heated with 70 parts of water under a reflux condenser until a test portion shows that the reaction is complete and that the whole has become soluble in water. The substance is then dried, preferably at 60° C. in vacuo. Thus is obtained a yellowish powder, which is most readily soluble in water and when absorbed on the cotton fiber yields a pure white.

*Example 10.*—300 parts by weight of phenol, 100 parts by weight of sulphur and 40 parts by weight of calcined potassium carbonate are heated with 70 parts of water under a reflux condenser until the reaction is complete. The excess phenol is then distilled off in vacuo together with the water. Thus is obtained a yellowish powder, which is most readily soluble in water and when absorbed on the cotton fiber yields a pure white.

We claim:

1. The process which comprises melting together sulphur, an at least equimolecular quantity of a monohydric phenol, an alkali metal carbonate in an amount of at least ⅕ of the quantity of the phenol taking part in the reaction in the presence of a small amount of water, until the reaction product has become completely soluble in water.

2. The process which comprises melting together sulphur, an at least equimolecular quantity of a monohydric phenol, an alkali metal carbonate in an amount of at least ⅕ to an equal part of the quantity of the phenol taking part in the reaction in the presence of a small amount of water, until the reaction product has become completely soluble in water.

3. The process which comprises heating under reflux sulphur, an at least equimolecular quantity of a monohydric phenol, an alkali metal carbonate in an amount of at least ⅕ of the quantity of the phenol taking part in the reaction in the presence of a small amount of water, until the reaction product has become completely soluble in water.

4. The process which comprises heating under reflux sulphur, an at least equimolecular quantity of a monohydric phenol, an alkali metal carbonate in an amount of at least ⅕ to an equal part of the quantity of the phenol taking part in the reaction in the presence of a small amount of water, until the reaction product has become completely soluble in water.

5. The process which comprises melting together sulphur, an at least equimolecular quantity of phenol, calcined sodium carbonate in an amount of at least ⅕ of the quantity of the phenol taking part in the reaction, until the reaction product has become completely soluble in water.

6. The process which comprises melting together sulphur, an at least equimolecular quantity of phenol, calcined sodium carbonate in an amount of at least ⅕ to an equal part of the quantity of the phenol taking part in the reaction, until the reaction product has become completely soluble in water.

7. The process which comprises heating under reflux sulphur, an at least equimolecular quantity of phenol, calcined sodium carbonate in an amount of at least ⅕ of the quantity of the phenol taking part in the reaction, until the reaction product has become completely soluble in water.

8. The process which comprises heating under reflux sulphur, an at least equimolecular quantity of phenol, calcined sodium carbonate in an amount of at least ⅕ to an equal part of the quantity of the phenol taking part in the reaction, until the reaction product has become completely soluble in water.

9. As new products sulphurized derivatives of phenols, obtained in accordance with the process as claimed in claim 1, being yellowish colored substances, soluble in water, and being valuable mordants for basic dyestuffs.

10. As new products sulphurized derivatives of phenols, obtained in accordance with the process as claimed in claim 2, being yellowish colored substances, soluble in water, and being valuable mordants for basic dyestuffs.

11. As new products sulphurized derivatives of phenols, obtained in accordance with the process as claimed in claim 3, being yellowish colored substances, soluble in water, and being valuable mordants for basic dyestuffs.

12. As new products sulphurized derivatives of phenols, obtained in accordance with the process as claimed in claim 4, being yellowish colored substances, soluble in water, and being valuable mordants for basic dyestuffs.

13. As new products sulphurized derivatives of phenol, obtained in accordance with the process as claimed in claim 5, being yellowish colored substances, soluble in water, and being valuable mordants for basic dyestuffs.

14. As new products sulphurized derivatives of phenol, obtained in accordance with the process as claimed in claim 6, being yellowish colored substances, soluble in water, and being valuable mordants for basic dyestuffs.

15. As new products sulphurized derivatives of phenol, obtained in accordance with the process as claimed in claim 7, being yellowish colored substances, soluble in water, and being valuable mordants for basic dyestuffs.

16. As new products sulphurized derivatives of phenol, obtained in accordance with the process as claimed in claim 8, being yellowish colored substances, soluble in water, and being valuable mordants for basic dyestuffs.

ALFRED BERGDOLT.
FRITZ BALLAUF.